No. 735,878. PATENTED AUG. 11, 1903.
R. E. HUTTON.
WHEAT STEAMER AND HEATER.
APPLICATION FILED NOV. 20, 1901.
NO MODEL.
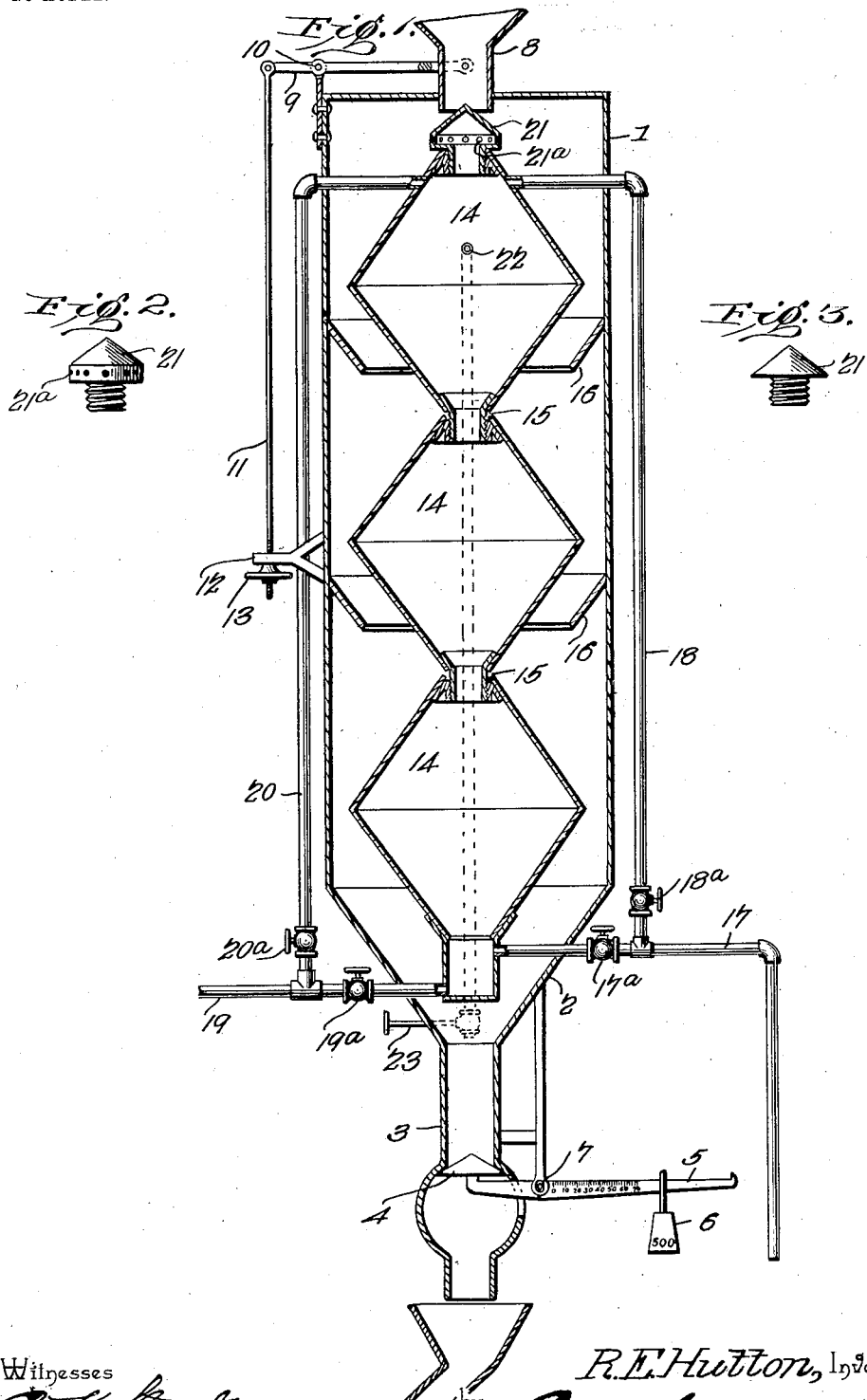

No. 735,878. Patented August 11, 1903.

UNITED STATES PATENT OFFICE.

ROMAINE E. HUTTON, OF SIOUX CITY, IOWA.

WHEAT STEAMER AND HEATER.

SPECIFICATION forming part of Letters Patent No. 735,878, dated August 11, 1903.

Application filed November 20, 1901. Serial No. 83,041. (No model.)

*To all whom it may concern:*

Be it known that I, ROMAINE E. HUTTON, a citizen of the United States, residing at Sioux City, in the county of Woodbury and State of Iowa, have invented a new and useful Wheat Steamer and Heater, of which the following is a specification.

My invention is an improved apparatus for heating and steaming wheat to put the same in condition for milling; and it consists in the peculiar construction and combination of devices hereinafter fully set forth and claimed.

In the accompanying drawings, Figure 1 is a vertical sectional view of a wheat steaming and heating apparatus constructed in accordance with my invention. Figs. 2 and 3 are detail views showing, respectively, the steam-escape nozzle for the upper end of the inner heating vessel and the plug which is substituted therefor when the wheat is to be merely heated and not also steamed.

In the embodiment of my invention I provide an outer vessel 1, which is preferably of cylindrical form, is vertically disposed, and has its lower end funnel-shaped, as at 2, and provided with a vertical discharge-spout 3 of suitable dimensions. A valve 4, which is here shown as of conical form, is disposed at the lower end of the spout 3 and is carried by a beam 5, on which is a sliding weight 6. The said beam is fulcrumed, as at 7.

A feed-spout 8 communicates with the upper end of the outer vessel 1 and has its lower end disposed and movable vertically in an opening in the center of the top of said vessel 1. Said feed-spout is connected to a rock arm or bar 9, which is fulcrumed, as at 10, and to which is connected an operating-rod 11. The latter has its lower portion adapted to move in a guide 12, is screw-threaded, and is provided with an adjusting-nut 13. By this means the feed-spout may be vertically adjusted in the upper end of the outer vessel 1, as will be understood.

Within the outer vessel is an inner heating vessel 14. One or more of the said inner heating vessels may be employed, and when a plurality of said inner heating vessels 14 are employed, as here shown, the same are coupled together, as at 15, and communicate with each other. In practice the said inner heating vessels are preferably of double conical form, so that their upper sides are adapted to deflect the wheat which passes downwardly through the outer vessel outwardly to the sides of said outer vessel. Within the outer vessel are a series of funnel-shaped deflectors 16, which are appropriately located with reference to the inner vessels 14 to cause the wheat after it has been deflected outwardly by one of said vessels to be deflected inwardly and discharged upon the upper conical or deflecting surface of the next lower vessel 14, so that the wheat in passing downwardly through the outer vessel is alternately deflected outwardly to the sides thereof and deflected inwardly against one of the inner vessels 14. I here show a steam-pipe 17, which communicates with the lower vessel 14 of the series, at the bottom thereof, and is adapted to admit steam to the interiors of the said inner vessels 14, so that the latter are heated by the steam and serve to heat the wheat as it passes over them and around them through the outer vessel 1 and over the deflectors 16. A branch pipe 18 is here shown as leading from the steam-pipe 17 to the upper inner vessel 14. Hence steam may be supplied both at the lower and upper ends of the connected series of inner heating vessels. Said pipes 17 18 are respectively provided with valves 17ª 18ª. An exhaust-pipe 19 leads from the lowermost of the inner vessels 14 at a point below the steam-pipe 17, so that such water as condenses in the inner vessels will be carried off by the said pipe 19. An exhaust-pipe 20 leads also from the upper inner vessel 14 and is coupled to the pipe 19. The latter and pipe 20 are respectively provided with valves 19ª 20ª.

At the upper end of the upper inner vessel 14 is a valve 21 of conical form, which, in coaction with the vertically-adjustable feed-spout 8, serves to regulate the quantity of wheat fed to the apparatus. Where the apparatus is used only for the purpose of heating the wheat the said valve 21 may be a solid plug, as shown in Fig. 3, and has a depending stem which is screwed into the upper end of the upper vessel 14. Under certain conditions it is desirable to not only heat the wheat prior to milling the same, but to also subject the same to the action of steam in order to dampen the wheat to some extent. To effect this, I provide a valve 21 in the form of a nozzle, as shown in Figs. 1 and 2 of the drawings, which nozzle has perforations 21ª at the base of the conical portion thereof to discharge steam into the outer vessel, and thereby subject the wheat as it passes through the apparatus to the direct action of the steam, as well as causing the wheat to be heated.

My improved apparatus, as will be observed, is heated from the center, is very effective, and effects a considerable economy of steam.

In Fig. 1 of the drawings I indicate a vent-pipe 22, which leads from the upper inner vessel 14 and is provided with a valve 23. By means of this vent-pipe air may be exhausted from the inner vessels in order to enable a circulation of steam to be maintained therein. By adjusting the weight 6 the discharge of the wheat from the apparatus may be regulated at will, so that the wheat may be caused to move as rapidly or as slowly through the apparatus as may be necessary to cause the same to be heated or steamed to the requisite extent. Hence the apparatus is automatic in its operation and after it has been properly adjusted requires practically no further attention to keep it in efficient working condition.

Having thus described my invention, I claim—

In a device of the class described, the combination of an outer vessel having a funnel-shaped lower end, a plurality of intercommunicating, hollow, double cones disposed within said casing, a hollow conical plug connected with the top of the uppermost cone and having openings in the sides thereof, means for supplying steam and for removing water of condensation connected with the lowermost cone, a plurality of funnel-shaped deflectors connected annularly with the outer casing and surrounding the lower inverted members of the double cones at a distance from the latter, a vertically-adjustable feed-funnel mounted in the top of the outer casing and discharging onto the conical plug of the upper cone, a valved exit-pipe extending downwardly from the funnel-shaped lower end of said outer casing, and means for counterweighting the valve in said exit-pipe.

In testimony that I claim the foregoing as my own I have hereto affixed my signature in the presence of two witnesses.

ROMAINE E. HUTTON.

Witnesses:
W. H. MARSH,
C. S. WALKER.